Sept. 13, 1966 P. VALDELIEVRE 3,272,497
SUPPORTING STRAP FOR FURNITURE UNIT
Filed May 7, 1965 3 Sheets-Sheet 2
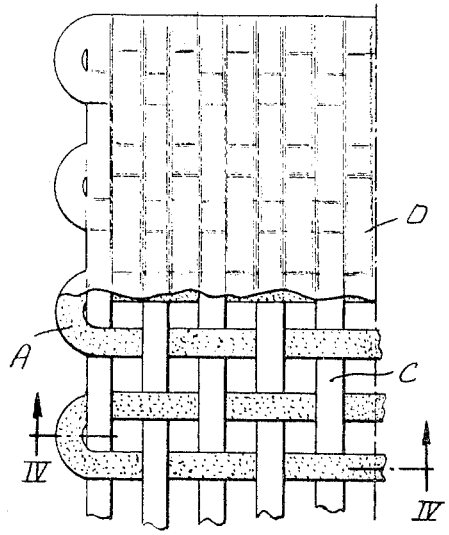
Fig. 3
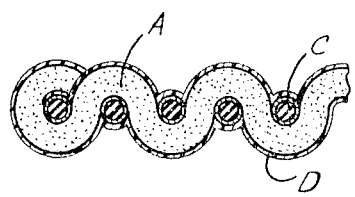
Fig. 4
Fig. 5
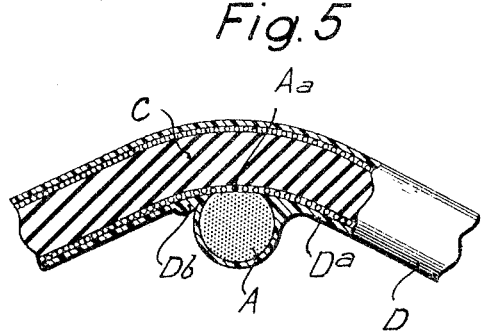
Fig. 6
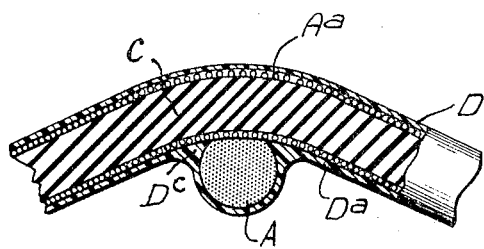

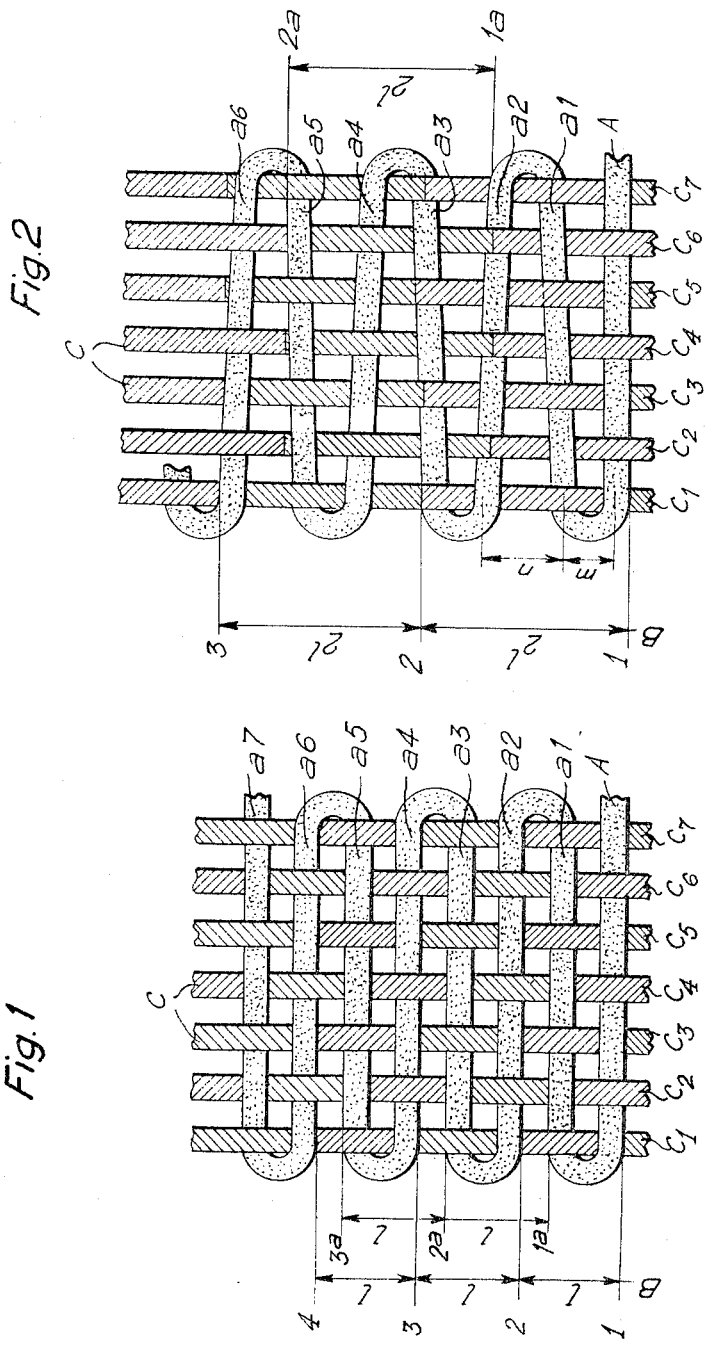

United States Patent Office 3,272,497
Patented Sept. 13, 1966

3,272,497
SUPPORTING STRAP FOR FURNITURE UNIT
Philippe Valdelievre, 95 Rue de l'Industrie,
Wervicq-Sud, Nord, France
Filed May 7, 1965, Ser. No. 467,800
4 Claims. (Cl. 267—110)

This application is a continuation-in-part of my application Ser. No. 830,052, filed July 28, 1959, which in turn was a continuation-in-part of my applications Ser. No. 599,496, filed July 23, 1956, and Ser. No. 665,800, filed June 14, 1957, both now abandoned.

The invention relates to seats for easy chairs and the like provided with extensible seat straps.

Heretofore, such seat straps have been made either from unelastic webs, for instance webs woven from jute warp and weft threads, or from elastic rubber bands.

Inelastic jute straps, stretched between the opposite sides of a seat frame, do not take part in the actual suspension of the seat, because of their inextensibility, but they serve rather as reaction members for the springs. They have the disadvantage that they easily tear, particularly as a result of the cutting stresses to which they are exposed on the edges of the frame.

Rubber straps take part in the suspension but are difficult to secure to the frame; their thickness makes it difficult to bend their ends again when they have been damaged by, or around, the nails or bolts used for their attachment.

In order to overcome said drawbacks, a third type of strap has appeared on the market for several years. Said strap is formed from rubber bands built up like a tire. The elongation of such straps is very small and limited by the elongation of the fabric, the warp and weft threads of which are biased relative to the longitudinal axis of the strap; therefore, the strap does practically not take part in the general suspension of the seat.

It is a principal object of the invention to provide a seat using straps which combine the resistance of a jute strap with the elasticity of a rubber strap without the drawbacks of either of them.

Other objects and advantages will be apparent from a consideration of the specification and claims.

The straps of my novel seat are built up of jute weft threads and extensible cotton-covered rubber warp threads, whereby weft and warp threads have substantially the same thickness.

A preferred form of the invention is shown in the accompanying drawings in which FIG. 1 is, on an enlarged scale, a view of a portion of a strap, without tension;

FIG. 2 is a view of the same portion under tension;

FIG. 3 is a view similar to FIG. 1 but showing part of the strap covered with a thin film of an elastomer;

FIG. 4 is a cross-sectional view taken along line IV—IV of FIG. 3;

FIGS. 5 and 6 are sectional views, on a very much enlarged scale, taken in the direction of the axis of a warp thread illustrated in FIG. 3.

Figure 7:
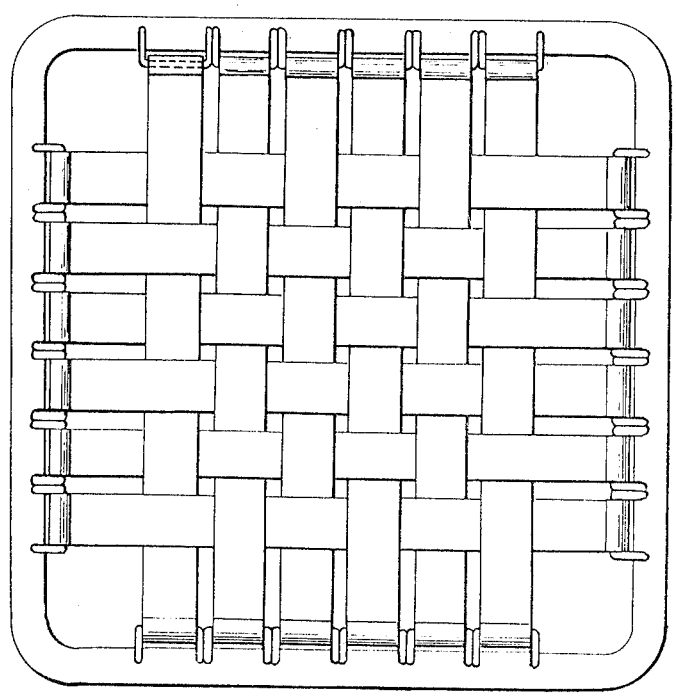
FIG. 7 shows a seat according to the invention with straps of the type shown in FIGS. 1–6, FIG. 7a discloses a means for attaching the web to the frame.
Figure 7A:
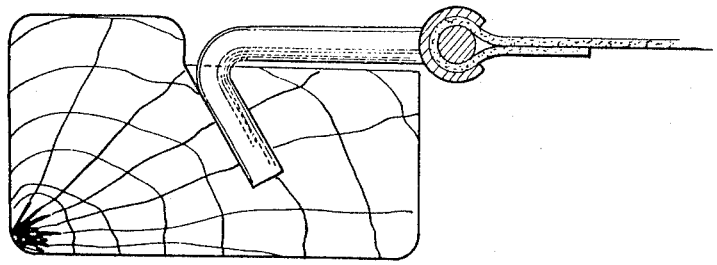

For a better understanding of the phenomena to be described, subsequent lengths of the warp threads are shown in the drawings in different shades.

Referring now first to FIG. 1, I have shown a portion of the strap as comprising a plurality of cotton covered rubber warp threads $C_1$, $C_2$ ... and a weft thread A which is interwoven with the warp threads in the conventional manner and passes back and forth from one edge of the strap to the other edge, the successive to and fro runs being designated $a_1$, $a_2$ and so on.

The lengths 1 of the warp threads $C_1$, $C_2$ ... between alternate runs of the weft are indicated at the margin.

A webbing strip suitable for seat straps should, for best performance, have under normal load an extension substantially corresponding to FIG. 2, where it is assumed that the warp threads C are held at B. In such a strap under tension, for instance, the length 1–2 of warp thread C, which, without tension, extends to the run $a_2$ (FIG. 1), should extend to the run $a_3$; length 2–3, which without tension extends from run $a_2$ to run $a_4$ would extend from run $a_3$ to $a_6$, and so on.

When attempts are made to obtain the desired strong resilience in one-way stretch rubber webbing by increasing the strength of the rubber threads, it will be found that thread diameters have to be used which are so large as to produce an overall thickness of the strap which makes it practically impossible to nail the strap to the seat frame. Using threads of harder rubber does not help either because then the strap becomes too hard and unelastic for its purpose.

I have found that by a particular combination of covered elastic warp threads with an unelastic weft thread, the elongation of the warps may be braked by the weft thread to such an extent that a webbing of warp threads and weft threads of uniform diameter may be used for seat straps.

In order to obtain this result, a particular coaction is required between the covering of the rubber threads and the material of the weft thread. As covering of the rubber threads I use cotton; for the weft thread, a fiber must be used which does not glide easily on the cotton wrapping of the elastic threads. Jute is the only material which, according to my investigations, combines such non-gliding, that is braking, properties with sufficient strength.

In FIG. 2, the elongation is shown by the difference between the lengths $m$ and $n$; it will be noted that in the loop of the weft threads the elongation of the warp threads is almost negligible, and that it increases towards the other end. It will further be seen that the braking force of the weft will be greater, the greater its diameter, that is the smaller the free travel of the warp thread is between the runs of the weft.

The properties of the described seat strap may be further enhanced by coating one or both surfaces with a very thin film D of an elastomer, for instance rubber; the latter modification is illustrated in FIGS. 3 and 4.

Such arrangement allows a less close weave of the weft thread and imparts to the strap greater flexibility. This result may be explained as follows: As already set forth in connection with the strap illustrated in FIG. 1, the weft thread A tends to be carried along the warp threads C, which it contacts directly, as long as this displacement is permitted by the reversing and loops, and it is only under these conditions that its frictional engagement with the threads causes their elongation to be retarded or braked.

In the case of the strap shown in FIG. 3 other forces are effective.

Although the thickness of the film D is not sufficient to prevent any relative movement from taking place between the weft thread A and the warp threads C, it is found that this movement is extremely reduced and attended in most cases by a rotation of said weft thread, thus increasing considerably the aforesaid braking action.

As a matter of fact, the weft thread A applies by the film D against the warp threads C will have, when this rotation tends to take place, to overcome (see FIG. 5) on the one hand a tensile force in the zone $D^a$ located before the weft thread in the direction of movement and on the other hand the resistance exerted by the zone located after the weft thread. Consequently the weft thread will tend to revolve about itself until this rotation forming the bead $D^b$ will increase the braking effect to such a degree that the strap elongation will be stopped.

It should be borne in mind that the relative movement of the weft thread A and of the warp threads associated therewith is not the same at all the crossings longitudinally of the strap. Indeed, a seat strap is secured by its ends to the seat frame and assuming that the load is supported intermediate the strap ends it will be found that the weft thread A involved at this point remains in the vertical plane passing through this point, and that the movements of the crossing adjacent to the weft thread are symmetrical in relation to this plane. As a result, a tension zone $D^c$ matches the zone $D^a$ (see FIG. 6) in the weft threads adjacent to this centre.

I claim:
1. A one-way extensible webbing which consists essentially of:
    a plurality of extensible cotton-covered rubber warp threads;
    and a plurality of inextensible weft threads, interwoven with said extensible cotton-covered warp threads, consisting essentially of jute, said jute weft threads and said cotton-covered rubber warp threads being of similar overall thickness, the interweaving of said jute weft threads with said cotton-covered rubber warp threads frictionally inhibiting the elongation of said cotton-covered rubber warp threads whereby the extensibility of said cotton-covered rubber warp threads is retarded.
2. A one-way extensible webbing which consists essentially of:
    a plurality of extensible cotton-covered rubber warp threads;
    a plurality of inextensible weft threads, interwoven with said extensible cotton-covered warp threads, consisting essentially of jute, said jute weft threads and said cotton-covered rubber warp threads being of approximately the same thickness, the interwoven jute weft threads frictionally inhibiting the elongation of said rubber warp threads whereby the extensibility of said cotton-covered rubber warp threads is substantially retarded;
    and a thin elastic coating of an elastomer covering at least one surface of said interwoven warp and weft threads forming said webbing.
3. In a resilient support formed from a plurality of criss-crossing one-way extensible straps, the improvement in said straps which consists essentially of:
    a plurality of extensible cotton-covered rubber warp threads in each of said straps;
    and a plurality of inextensible weft threads, interwoven with said extensible cotton-covered warp threads of each of said straps, consisting essentially of jute, said jute weft threads and said cotton-covered rubber warp threads being of similar overall thickness, the interwoven jute weft threads frictionally inhibiting the elongation of said rubber warp threads whereby the extensibility of said cotton-covered rubber warp threads is substantially retarded, and the extensibility of each of said straps is, in turn, substantially retarded.
4. The resilient support of claim 3 wherein the surfaces of each of said straps have a thin elastomeric coating thereon.

References Cited by the Examiner
UNITED STATES PATENTS

| | | | |
|---|---|---|---|
| 926,821 | 7/1909 | Ordway | 267—110 |
| 1,347,254 | 7/1920 | Dankmeyer | 139—426 |
| 1,546,738 | 7/1925 | Laurain | 137—422 |
| 2,332,848 | 10/1943 | Grabec | 28—80 |
| 2,484,125 | 10/1949 | Silvain | 28—80 |
| 2,643,686 | 6/1953 | Richards | 139—421 |

ARTHUR L. LA POINT, *Primary Examiner.*

EUGENE G. BOTZ, *Examiner.*

R. A. BERTSCH, *Assistant Examiner.*